(12) United States Patent
Dubois et al.

(10) Patent No.: US 6,382,844 B1
(45) Date of Patent: May 7, 2002

(54) CONNECTOR ELEMENT FOR OPTICAL FIBER

(75) Inventors: Serge Dubois, Roybon; Emmanuel Grassin d'Alphonse, Lyons, both of (FR)

(73) Assignee: Radiall, Rosny-sous-Bois (FR)

( * ) Notice: Subject to any disclaimer, the term of this patent is extended or adjusted under 35 U.S.C. 154(b) by 0 days.

(21) Appl. No.: 09/471,352

(22) Filed: Dec. 23, 1999

(30) Foreign Application Priority Data

Dec. 24, 1998 (FR) .............................. 98 16450

(51) Int. Cl.⁷ ................................ G02B 6/36
(52) U.S. Cl. ........................... 385/81; 385/82; 385/83
(58) Field of Search .......................... 385/81, 82, 83, 385/84, 85, 97, 98

(56) References Cited

U.S. PATENT DOCUMENTS 5,283,850 A * 2/1994 Souloumiac ................ 385/84
6,010,250 A * 1/2000 Sung .......................... 385/78

FOREIGN PATENT DOCUMENTS

| DE | 19533498 | 3/1997 |
| EP | 0413844 | 2/1991 |
| WO | 9719378 | 5/1997 |

\* cited by examiner

*Primary Examiner*—Mohammad Sikder
(74) *Attorney, Agent, or Firm*—Schweitzer Cornman Gross & Bondell LLP

(57) ABSTRACT

The invention relates to a connector element for optical fiber, said connector element comprising: a ferrule (3) serving to hold a stripped end portion of an optical fiber; a ferrule support (2) having a front end suitable for supporting the ferrule, a rear end (10), and a channel extending from the rear end (10) to the front end and via which the non-stripped portion of the optical fiber can pass through said support (2) so that the stripped end portion of the fiber can be engaged in the ferrule (3); and a body (1) inside which the ferrule (3) and its support (2) are received, said body having a front end for connecting the connector element to another connector element, and a rear end (11) extending beyond the rear end (10) of the ferrule support, when the connector is in the assembled state. In its rear portion, the body (1) is provided with a cylindrical portion (12) around which a crimp sleeve engages, and with a notch (13) extending from the rear end (11) of the body so as to provide unobstructed radial access to the ferrule support (2).

18 Claims, 6 Drawing Sheets

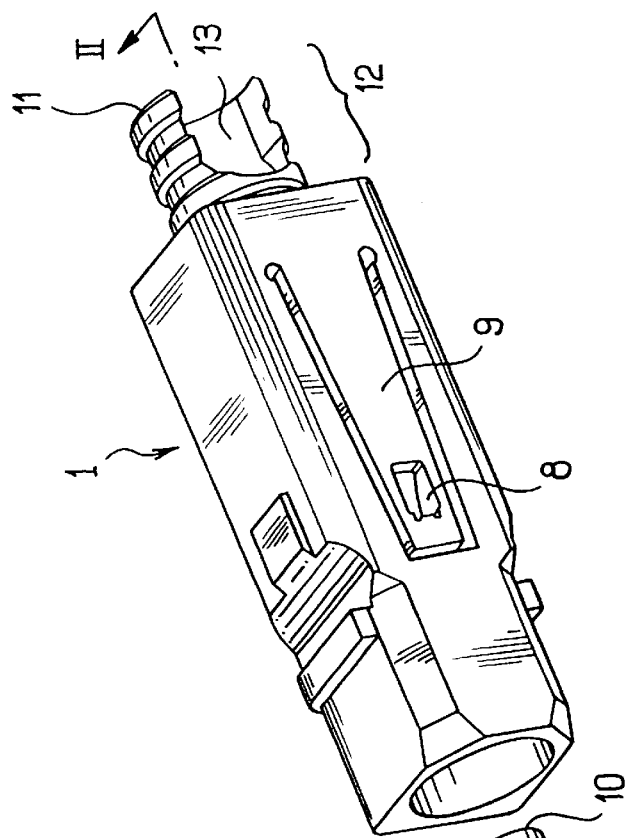
FIG_1
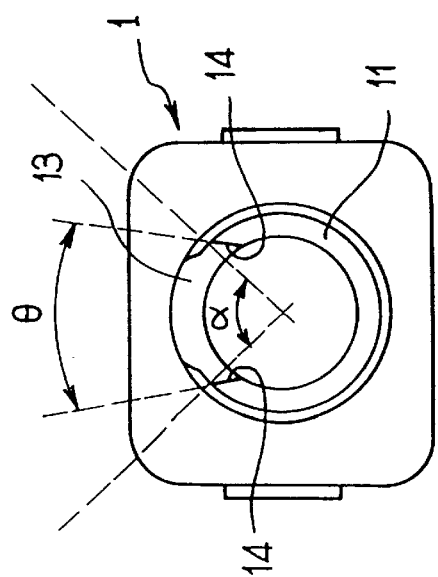
FIG_3

FIG_7

CONNECTOR ELEMENT FOR OPTICAL FIBER

The present invention relates to a connector element for optical fiber.

In the present invention the term "ferrule" is used, as it is by specialists in the field, to designate a cylindrical sheath provided with a central channel serving to receive the stripped end portion of an optical fiber so as to hold it accurately in alignment with another optical fiber held by the ferrule of another connector element.

It is known that putting in place connector elements at the ends of optical fibers requires difficult and often lengthy handling operations, and the quality of the optical transmission between the fibers connected in that way depends on those handling operations being performed properly.

Among the required operations, there is one that requires particular care because it can not only degrade the quality of the optical connection, but it can also damage the connector. The operation in question is that of gluing the stripped optical fiber inside the ferrule of the connector.

In order to perform that operation, a syringe is inserted into the connector via the rear end thereof, to the mouth of the central channel of the ferrule, so as to deposit a drop of glue therein.

Once the drop of glue has been deposited, it is necessary to extract the syringe from the connector element without soiling the inside of said element, while a drop of glue is projecting from the end of the syringe.

The difficulty consists in withdrawing the syringe while holding it accurately oil the axis of the connector element, so that it does not touch any portion of the connector element.

Unfortunately, the few millimeters of diameter of the orifice via which rho syringe is inserted and then withdrawn make it almost impossible to withdraw the syringe manually without it touching the walls of said orifice. Automating that operation is justified only for large quantities of cabling in the factory and it does not solve the problem of cabling on the site on which the fiber is used, special tools being required for such in situ cabling.

An object of the present invention is to provide a solution to that particular problem of extracting the syringe without soiling the inside of the connector element.

The present invention provides a connector element for optical fiber, said connector element comprising:

a ferrule serving to hold a stripped end portion of an optical fiber;

an elongate ferrule support having a front end suitable for supporting the ferrule, a rear end opposite from the front end, and a channel extending from the rear end to the front end and via which the non-stripped portion of the optical fiber can pass through said support so that the stripped end portion of the fiber can be engaged in the ferrule; and a body inside which the ferrule and its support are received, said body having a front end for connecting the connector element to another connector element, and a rear end via which the optical fiber penetrates for the purpose of engaging in the ferrule support and then in the ferrule, said rear end extending beyond the rear end of the ferrule support, when the connector is in the assembled state;

said connector element being characterized by the fact that, in its rear portion, the body is provided with a cylindrical portion which preferably has a crenelated outside wall and around which a crimp sleeve engages, and with a notch extending from the rear end of the body so as to provide unobstructed radial access to the ferrule support.

The notch provided in the wall of the rear end of the body makes it possible for the syringe to be released from the ferrule support directly Lo the outside of the connector element without touching any other piece of said connector element.

Thus, the syringe is guided along the entire length of its exit path through the ferrule support which can enter into contact: with the drop of glue projecting form the syringe without that having any adverse effects, since the non-stripped optical fiber is to be glued inside the ferrule support. As soon as it exits from the ferrule support, the syringe leaves the connector element without soiling the rear end of the body thereof.

In order to facilitate the release of the syringe, provision is preferably made for the notch to be wider than the rear end of the ferrule support.

In a preferred embodiment of the invention, the notch is substantially U-shaped, the middle axis of the U-shape being parallel to the longitudinal axis of the ferrule support.

Advantageously, the ferrule support is a piece that is substantially circularly symmetrical, as is known, and the body is a piece that is internally circularly symmetrical and coaxial with the ferrule support.

For the purpose of further facilitating the release of the syringe at the outlet of the body of the connector element, each branch of the U-shape of the notch is cut out in the thickness of the wall of the body in a respective plane, arid the two planes corresponding to respective ones of the branches of the U-shape forming an angle θ between them of about 20° and offering an opening that subtends an angle of about 40° on the axis of the body.

In a particular embodiment of the invention, the connector element further includes a structure for reinforcing the rear end of the body, in the form of a piece, shaped to fit into said body via the rear end thereof so as to support the wall of said body around the notch.

This reinforcing structure supports the wall of the body at its rear end, where it is weakened by the presence of the notch.

The configuration of the invention for the cylindrical rear portion of the connector element and for the crimp sleeve that surrounds it constitutes securing means for securing the strength members of an optical cable including the optical fiber to the connector element so as to prevent the ferrule and its support from being subjected to any traction that is exerted on the optical cable.

In a preferred variant, the securing means also secure the outer covering of the optical cable to the body of the connector element so as to prevent the ferrule and its support from being subjected to any traction that is exerted on the optical cable.

In a preferred version of this embodiment, the securing means further include an anvil, the anvil being a circularly-symmetrical piece engaged under the wall of the body of the connector element and around the stripped optical fiber, the crimp sleeve undergoing plastic deformation by being crushed, thereby holding the strength members captive against the wall of the body that is supported by the anvil.

In a particular embodiment, the reinforcing structure and the anvil are constituted by a single piece.

In this embodiment, it may he advantageous for the anvil to extend the outside wall of the body of the connector element rearwards, thereby increasing the length over which the strength members are crimped, without lengthening the connector element.

In addition, the anvil may be provided with a rear segment of smaller diameter organized to enrage under the covering of the cable, the inside of the crimp sleeve being provided with a constriction of corresponding diameter, so that, on crimping the strength members, the covering of the cable is simultaneously secured to the anvil.

In a particular embodiment of the invention, a cable support sleeve is that is resiliently flexible is provided at the rear of the connector element and serves to guide the optical cable while preventing it from kinking as it leads out from the connector element.

In a variant of this embodiment, the cable support sleeve is engaged on the crimp sleeve, and the crimp sleeve extends towards the rear of the connector beyond the anvil where it is provided with a flared mouth offering radial clearance to the optical cable so that when the cable support sleeve is subjected to bending and moves the optical cable off axis relative to the connector element, said cable support sleeve bears against the crimp sleeve, and so that the distance between the rear end of the anvil and the rear end of the crimp sleeve makes it possible for the optical cable, whose axis coincides with the axis of the connector element at the rear outlet of the anvil, to bend progressively so as to lie on the axis of the cable support sleeve at the outlet of the crimp sleeve.

More generally, in its rear portion, the crimp sleeve acts as a spreader by holding the support sleeve at a distance from the cable when said sleeve deforms, so as to conserve radial and axial clearance around the cable to enable it to move off-axis without being sheared.

In other words, at the rear of the connector element, the cable support sleeve bears against a cylindrical spreader having a flared mouth and that extends to the rear of the connector element around and beyond any securing means for securing the cable.

Preferably, that end of the cable support sleeve which is opposite from body of the connector element is provided with a flared mouth enabling the optical cable leading out from said outlet sleeve to take up a curvature compatible with the minimum radius of curvature of the optical fiber.

In order to enable the invention to be better understood, embodiments given by way of non-limiting example are described below with reference to the accompanying drawings, in which:

FIG. 1 is an exploded perspective view of an SCtype connector element;

Figure 2:
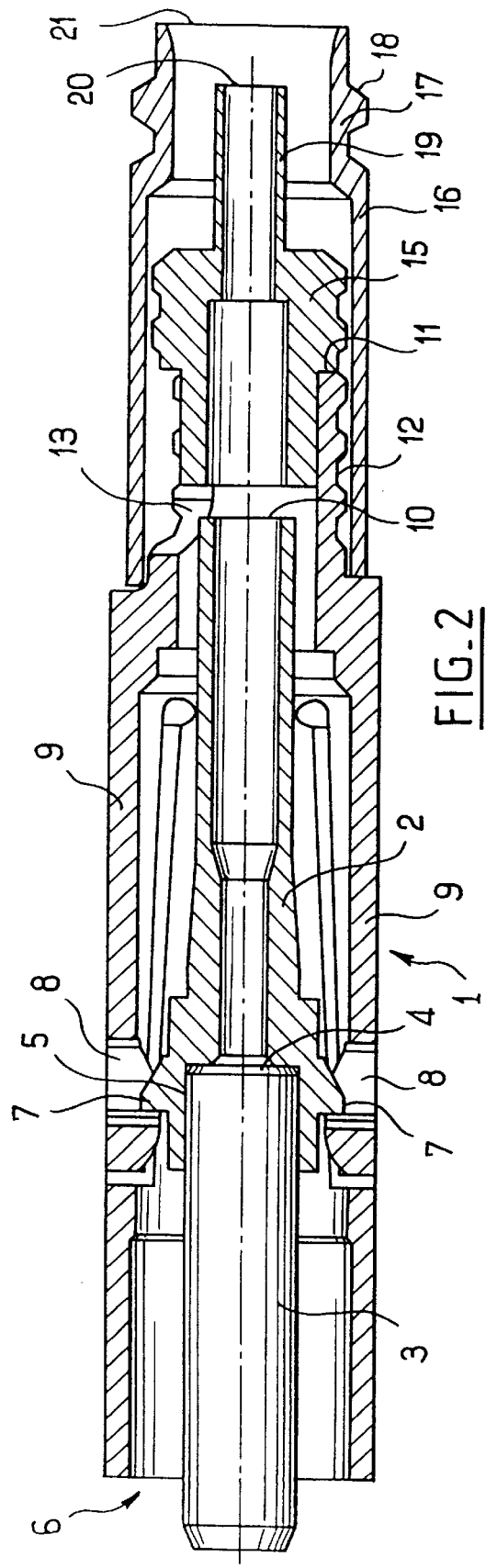
FIG. 2 is an axial section view on II—II of the connector element of FIG. 1, shown in the assembled state.
Figure 4:
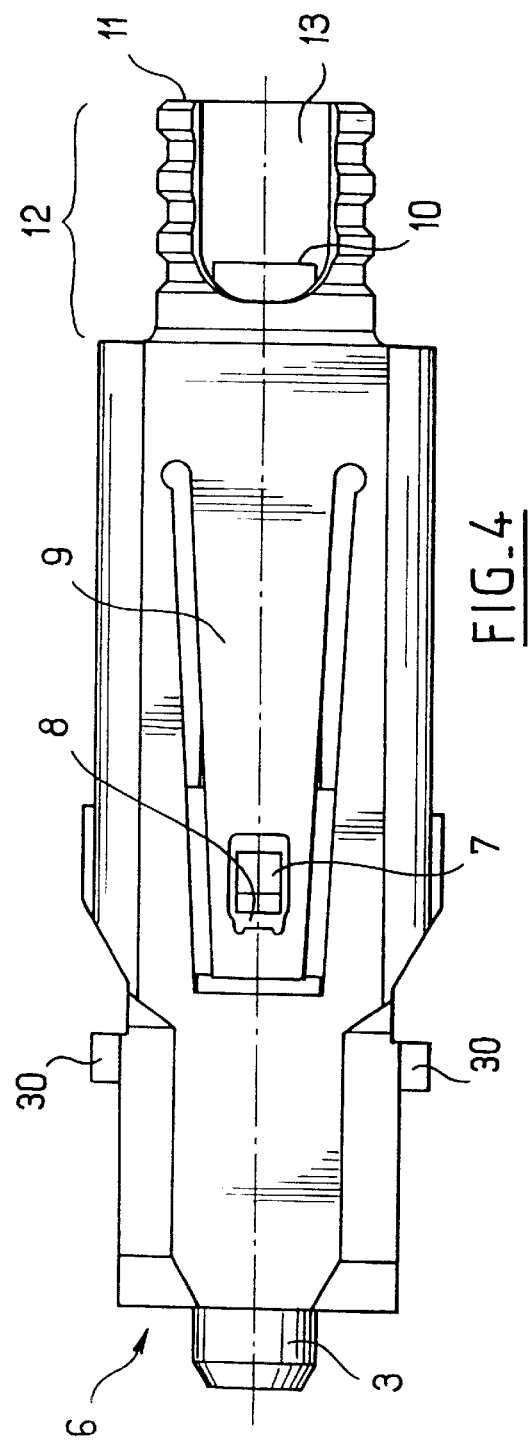
Figure 5:
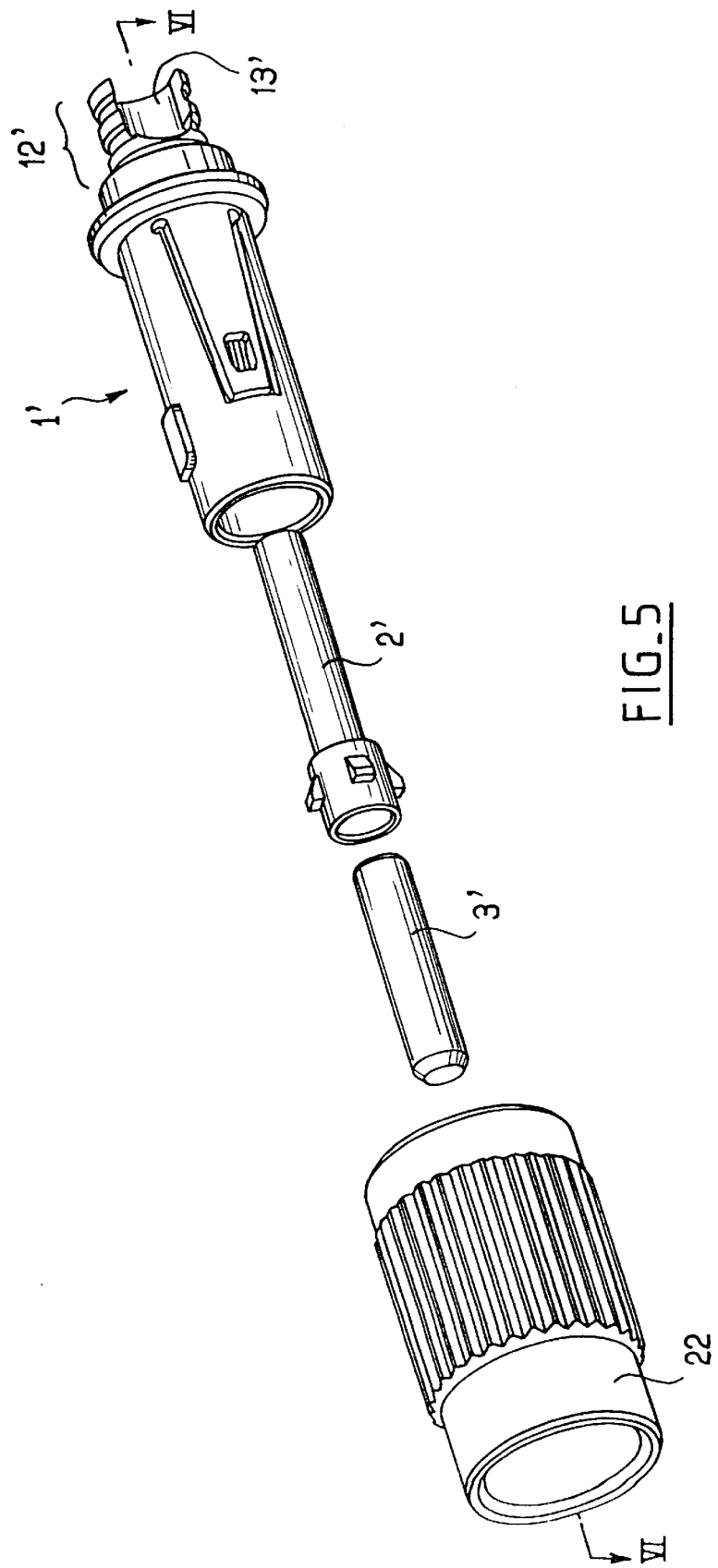
Figure 6:
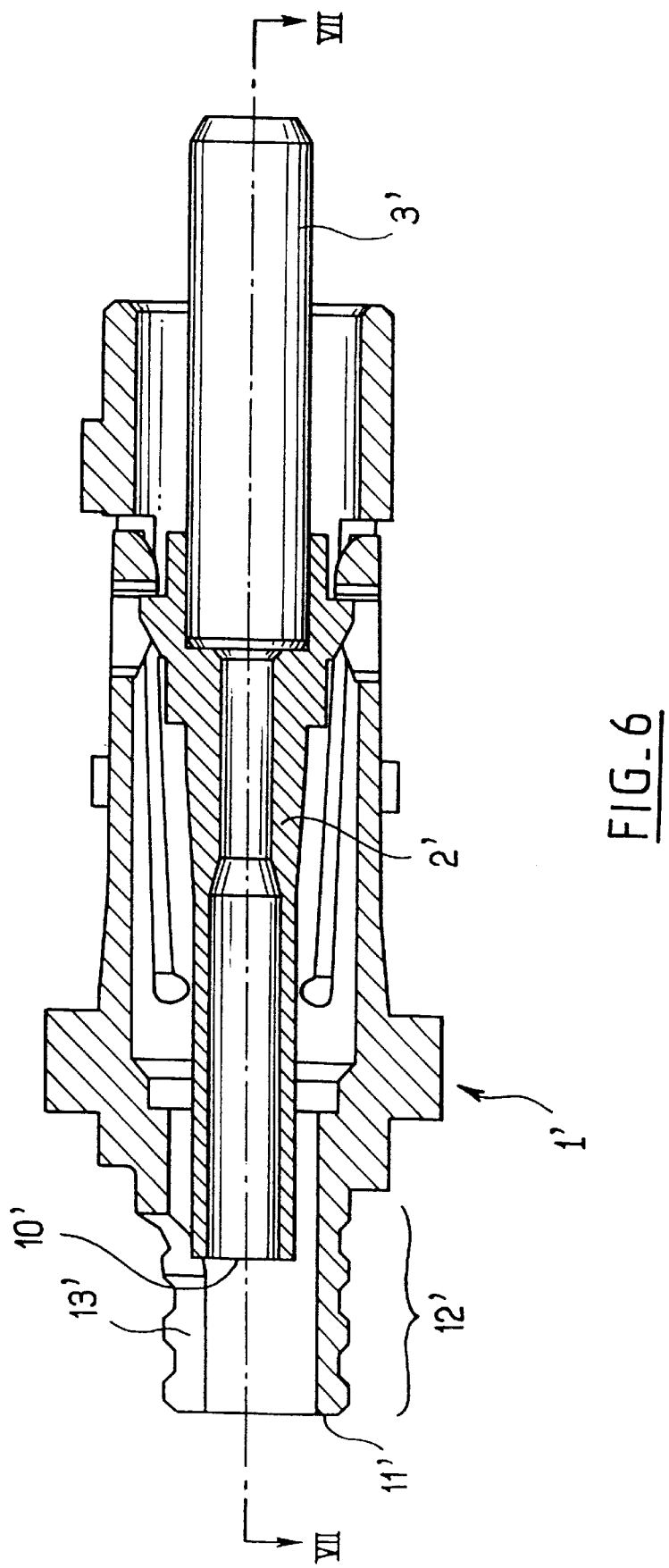
Figure 7:
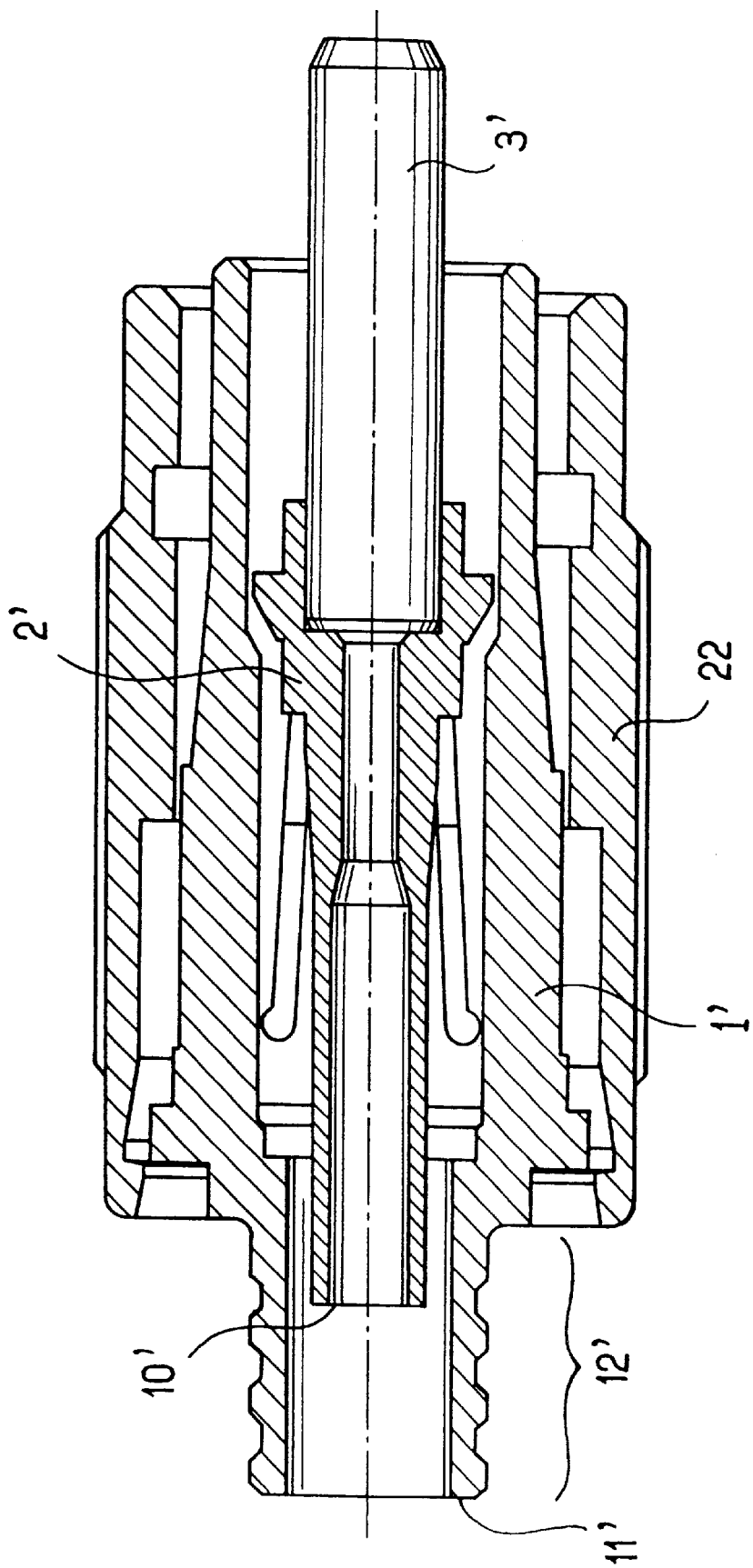
Figure 8:
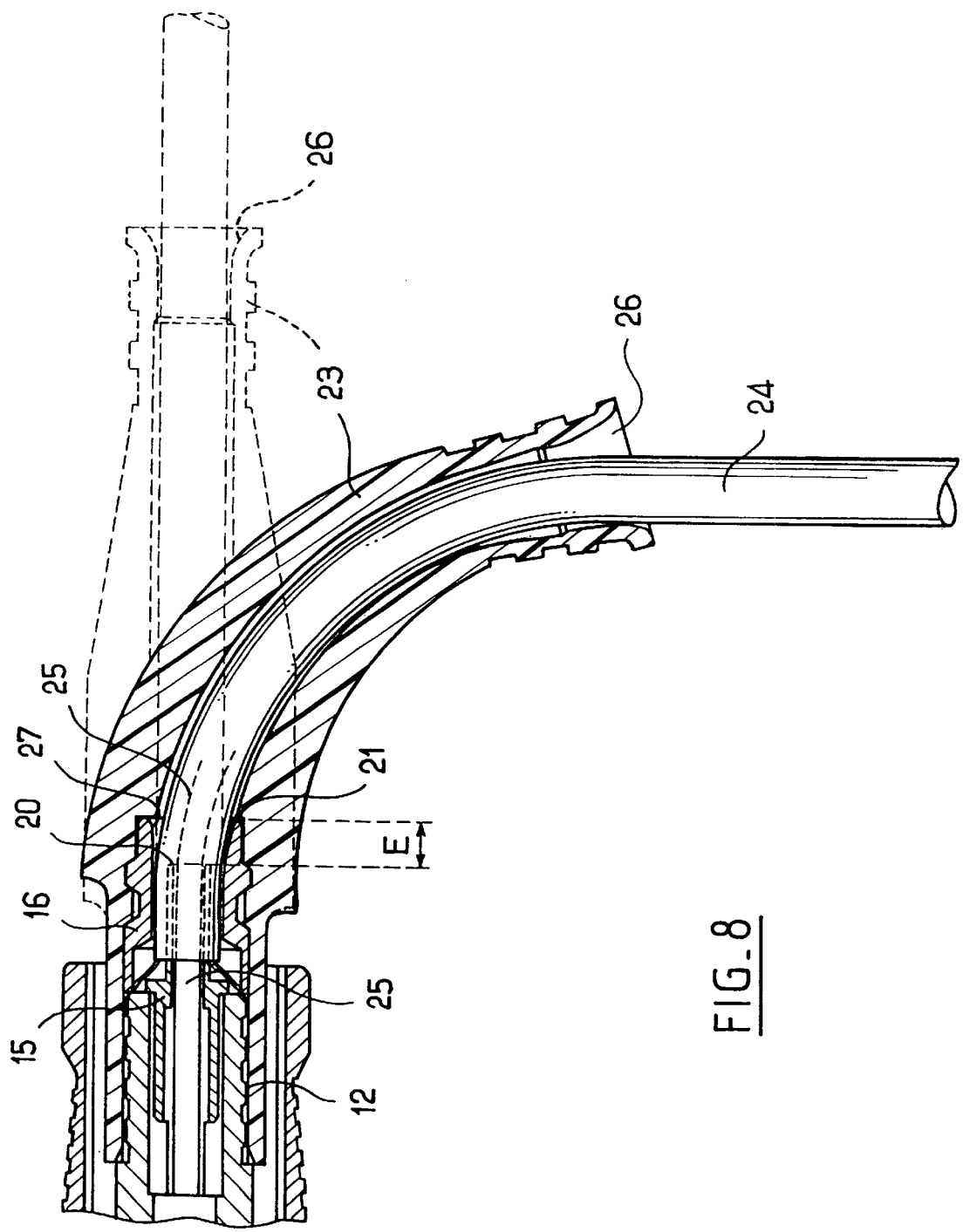

FIG. 3 a view from the right of FIG. 2;

FIG. 4 is a plan view of FIG. 2;

FIG. 5 is an exploded perspective view of an FC-type connector element;

FIG. 6 is an axial section view on VI—VI of the connector element of FIG. 5, shown without its screw cap;

FIG. 7 is an axial section view on VII—VII of FIGS. 6, with the screw cap; and FIG. 8 is an axial section view of a cable guide sleeve mounted on an SC-type connector element.

The connector element shown in FIGS. 1 to 4 is organized to connect to another complementary connector element (not shown). It comprises a housing or body 1, a ferrule support 2, and a ferrule 3 which, via its ends 4 is fitted into an end socket 5 in the ferrule support.

The details of the outside shape of the body 1 are not described herein.

In the remainder of the description of FIGS. 1 to 4, the "rear" end of each part is that one of its ends which faces rightwards, and its "front" end is that one of its ends which faces leftwards As can be seen in the section view of FIG. 2, the ferrule 3 and the ferrule support 2 are engaged as a single piece into the body 1 via the front end 6 thereof until the retaining lugs 7 on the support 2 snap-fasten into recesses 8 provided for this purpose in resilient retaining arms cut out in the wall of the body 1.

A channel extends axially through the support so as to enable an optical fiber to pass through it to the ferrule.

When the ferrule support 2 is in position in the body 1, its rear end 10, opposite from the ferrule, extends to the vicinity of the rear end 11 of the body but without projecting beyond said end.

In other words, the ferrule support 2 is contained entirely within the body 1.

In its rear portion, said body includes a crenelated cylindrical portion 12.

As can be seen in the plan view of FIG. 4, this cylindrical portion 12 is provided with a U-shaped notch 13 cut out in its thickness and extending from the rear end 11 of the body over a length long enough to form an unobstructed radial access to the rear end 10 of the support 2.

The width of the notch 13 is greater than the width of the channel inside the support 2.

FIG. 3 makes it possible to see that the U-shaped branches or edges 14 of the notch form an angle $\theta$ between them of about 20° and they subtend an angle $\alpha$ on the axis of the body of about 40°, which offers a lateral outlet space which is quite large.

Such an angle makes it possible for an operator holding a syringe (not shown) engaged in the ferrule support to remove the syringe from the connector element without it touching the body.

The operation performed by the operator consists in removing the syringe while holding it pressed against the inside wall of tile support 2, towards tile notch 13.

Thus, when the end of the syringe reaches the mouth 10 of the support 2, it is released therefrom and exits immediately from the body by passing through the notch 13 without touching the wall of the body.

The risk of soiling the inside of the connector element with glue residue is thus almost removed.

The rear end 10 of the ferrule support is extended by an anvil 15 which also serves as a support structure for supporting the wall of the body around the notch.

It can be observed that the anvil 15 is crenelated and reproduces the crenellations present in the outside wall of the cylindrical portion 12 of the body.

Such crenellations serve to hold the strength members of an optical cable (not shown) directly on the body 1 by means of a crimp sleeve 16 surrounding the cylindrical portion 12 of the body as well as the anvil 15, the sleeve being designed to be crushed by crimping from the outside.

On its outside surface, the body 1 is provided with locking elements 30 suitable for co-operating with a complementary connector (not shown). Thus, by retaining the cable directly on the body 1, it is possible to prevent any traction exerted by the cable from being transmitted to the ferrule support 2 and to the ferrule itself.

It can be understood that the large retaining surface area offered by the crenelated portion 12 of the body, extended by the crenelated outside wall of the anvil 15, makes it possible to retain the strength members of the cable very effectively.

The crimp sleeve 16 surrounds the cylindrical portion 12 of the body and is extended therebeyond by a segment 17 of smaller diameter, in particular of smaller inside diameter, and provided with an outwardly-projecting collar 10 serving to retain a cable support sleeve (not shown in the figure) which is described below.

In this portion of the crimp sleeve, the anvil 15 also includes a segment 19 of reduced diameter which is organized to engage under the covering of the optical cable and to serve as an anvil for the crimp sleeve so as to pinch said covering, as shown in FIG. 8.

This pinching is particularly effective because the two facing metal pieces, namely the segment 19 of the anvil and the segment 17 of the crimp sleeve, cannot slip relative to each other, since the crimp sleeve is crimped onto the anvil.

The crimping operation takes place simultaneously on the covering and on the strength members.

It can be noted that the rear end 20 of the anvil is situated set back from the rear end 21 of the crimp sleeve. The purpose of this configuration is to enable the optical fiber leading out from the ferrule support and from the anvil to bend without kinking so as to be aligned with the optical cable if said optical cable moves off axis due to traction exerted on the cable transversely to the axis of the connector element.

FIGS. 5 to 7 show an example of an FC-type connection element whose body is provided with a notch, as described above, so as to make it easier to extract a syringe by releasing it laterally.

In these figures, the portions corresponding to the portions described above with reference to FIGS. 1 to 4 are referenced by the same numerals followed by the prime symbol.

As is known, the connector element comprises a body 1', a ferrule support 2', a ferrule 3', and a screw cap 22 making it possible to hold the connector element coupled to a complementary connector element.

The configuration of the crenelated portion 122', of the notch 13', and of the crimp sleeve, which are almost identical to those of the embodiment shown in FIGS. 1 to 41, shows that the notch of the invention can be provided on a connector element of any type.

In general, the present invention applies to all types of optical connector element, including those whose insides are not exactly identical to those described above. For example, the ferrule and its support may be constituted by a single piece.

FIG. 8 shows the rear end of the connector element of FIGS. 1 to 4, as provided with its cable support sleeve 23 which is engaged on the crimp sleeve 16 crimped onto the crenelated outside wall 12 of the body of the connector element. The cable support sleeve 23 is shown in dashed lines in its rest position that it takes up when the cable 24 leading out from the connector element is not subjected to any stress, and in solid lines in a bent position in which the cable is pulled perpendicularly to the axis of the connector element.

This figure makes it possible to understand clearly how the distance E between the rear ends 20, 21 of the anvil 15 and of the crimp sleeve 16, and how the flared mouth 27 of the crimp sleeve enable the optical cable to bend without kinking between the outlet of the anvil and the end 21 of the crimp sleeve so as to lead out from the connector element in alignment with the cable support sleeve.

In particular, it can be seen that, when the cable is subjected to traction perpendicular to the axis of the connector element, the cable support sleeve 23 performs its function by preventing the cable from kinking but, because it is deformed, it exerts a shear force on the cable at the outlet 21 of the crimp sleeve 16.

By means of the axial offset E and of the mouth 2which offers radial clearance to the cable, the shear force causes the optical cable to be bent, but only uniformly, so that the optical cable can lead out from the anvil 15 along the axis thereof and can bend progressively without kinking until it reaches the outlet 21 of the crimp sleeve, where the cable is no longer on the axis of the connector element, but rather it follows the curvature of the cable support sleeve.

At its free end, the cable support sleeve 23 is provided with a flared mouth 26 which serves to support the cable at the outlet of said sleeve, when it is subjected to traction perpendicular to the axis of the connector element that is too weak to bend the support sleeve. In such a case, the sleeve remains in its rest position, as shown in dashed lines, and the cable leads out from the sleeve by pressing against its flared mouth, which preserves the optical fiber by maintaining its radius of curvature above its acceptable threshold.

Naturally, the above-described embodiments are in no way limiting and any desirable modification may be made to them without going beyond the ambition of the invention as defined by the claims.

What is claimed is:

1. A connector element for optical fiber, said connector element comprising:

a ferrule (3, 3') serving to hold a stripped end portion of an optical fiber;

an elongate ferrule support (2, 2') having a front end suitable for supporting the ferrule, a rear end (10, 10') opposite from the front end, and a channel extending from the rear end (10, 10') to the front end and via which the non-stripped portion (24) of the optical fiber can pass through said support (2, 2') so that the stripped end portion of the fiber can be engaged in the ferrule (3, 3'); and a body (1, 1') inside which the ferrule (3, 3') and its support (2, 2') are received, said body having a front end for connecting the connector element to another connector element, and a rear end (11, 11') via which the optical fiber penetrates for the purpose of engaging in the ferrule support and then in the ferrule, said rear end (11, 11') extending beyond the rear end (10, 10') of the ferrule support, when the connector is in the assembled state;

said connector element being characterized by the fact that, in its rear portion, the body (1, 1') is provided with a cylindrical portion (12, 12') around which a crimp sleeve (16) engages, and with a notch (13, 13') extending from the rear end (11, 11') of the body so as to provide unobstructed radial access to the ferrule support (2, 2').

2. A connector element according to claim 1, characterized by the fact that the notch (13, 13') as wider than the rear end (10, 10') of the channel inside the ferrule support.

3. A connector element according to claim 1, characterized by the fact that the notch (13, 13') is substantially U-shaped.

4. A connector element according to claims 1, characterized by the fact that the ferrule support (2, 2') is a piece that is substantially circularly symmetrical.

5. A connector element according to claim 4, characterized by the fact that the body (1, 1') is a piece that is internally circularly symmetrical and coaxial with the ferrule support.

6. A connector element according to claim 3 and to said connector element being characterized by the facts that each branch (14) of the U-shape of the notch (13, 13') is cut out in the thickness of the wall of the body in a respective plane, and that the two planes corresponding to respective ones of the branches of the U-shape form an angle θbetween them of about 20° and offer an opening that subtends an angle α of about 40° on the axis of the body.

7. A connector element according to claim 1, characterized by the fact that it further includes a structure for reinforcing the rear end of the body, in the form of a piece (15) shaped to fit into said body via the rear end thereof so as to support the wall of said body around the notch.

8. A connector element according to claim 1, characterized by the fact that the cylindrical rear portion (12, 12') and the crimp sleeve (16) constitute securing means for securing the strength members of an optical cable including the optical fiber to the connector element so as to prevent the ferrule and its support from being subjected to any traction that is exerted on the optical cable.

9. A connector element according to claim 8, characterized by the fact that the securing means also secure the outer covering of the optical cable to the body of the connector element so as to prevent the ferrule and its support from being subjected to any traction that is exerted on the optical cable.

10. A connector element according to claim 1, characterized by the fact that the outside wall of said cylindrical portion (12, 12') of the rear portion of the connector element is crenelated.

11. A connector element according to claim 8, characterized by the fact that the securing means further include an anvil (15) and a crimp sleeve (16), the anvil being a circularly-symmetrical piece engaged around the stripped optical fiber, penetrating under the covering of the cable and around which the strength members are distributed, the sleeve being organized to undergo plastic deformation by being crushed, thereby holding captive the strength members and optionally the covering around the anvil.

12. A connector element according to claim 7, characterized by the fact that the reinforcing structure and the anvil are constituted by a single piece (15).

13. A connector element according to claim 12, characterized by the facts that the anvil (15) extends the outside wall (12) of the body of the connector element rearwards, and that it is provided with a rear segment (19) of smaller diameter organized to enrgage under the covering of the cable, the inside of the crimp sleeve being provided with a constriction of corresponding diameter (17).

14. A connector element according to claim 13, characterized by the fact that said anvil (5) is crenelated.

15. A connector element according to claim 1, characterized by the fact that it is provided with a cable support sleeve (23) that is resiliently flexible and that serves to guide the optical cable as it leads out from the connector element at the rear thereof.

16. A connector element according to claim 8, characterized by the fact that, at the rear of the connector element, the cable support sleeve (23) bears against a cylindrical spreader (16) having a flared mouth (27) and that extends to the rear of the connector element around and beyond any securing means (15, 16).

17. A connector element according to claim 11, characterized by the facts that the cable support sleeve is engaged on the crimp sleeve, and that the crimp sleeve (16) extends towards the rear of the connector beyond the anvil (15) where it is provided with a flared mouth (27) offering radial clearance to the optical cable so that when the cable support sleeve is subjected to bending arid moves the optical cable off axis relative to the connector element, said cable support sleeve bears against the crimp sleeve (16), and so that the distance (E) between the rear end (20) of the anvil and the rear end (21) of the crimp sleeve makes it possible for the optical cable, whose axis coincides with the axis of the connector element at the rear outlet of the anvil, to bend progressively so as to lie on the axis of the cable support sleeve at the outlet of the crimp sleeve.

18. A connector element according to claim 15, characterized by the fact that, at that end of its cable support sleeve (23) which is opposite from the body of the connector element, said connector element is provided with a flared mouth (26) enabling the optical cable leading out from said outlet sleeve to take up a curvature compatible with the minimum radius of curvature of the optical fiber.

* * * * *